May 21, 1968   L. E. FISHER   3,384,856
MULTI-PHASE ELECTRIC POWER DISTRIBUTION SYSTEM
Filed April 15, 1966   6 Sheets-Sheet 1
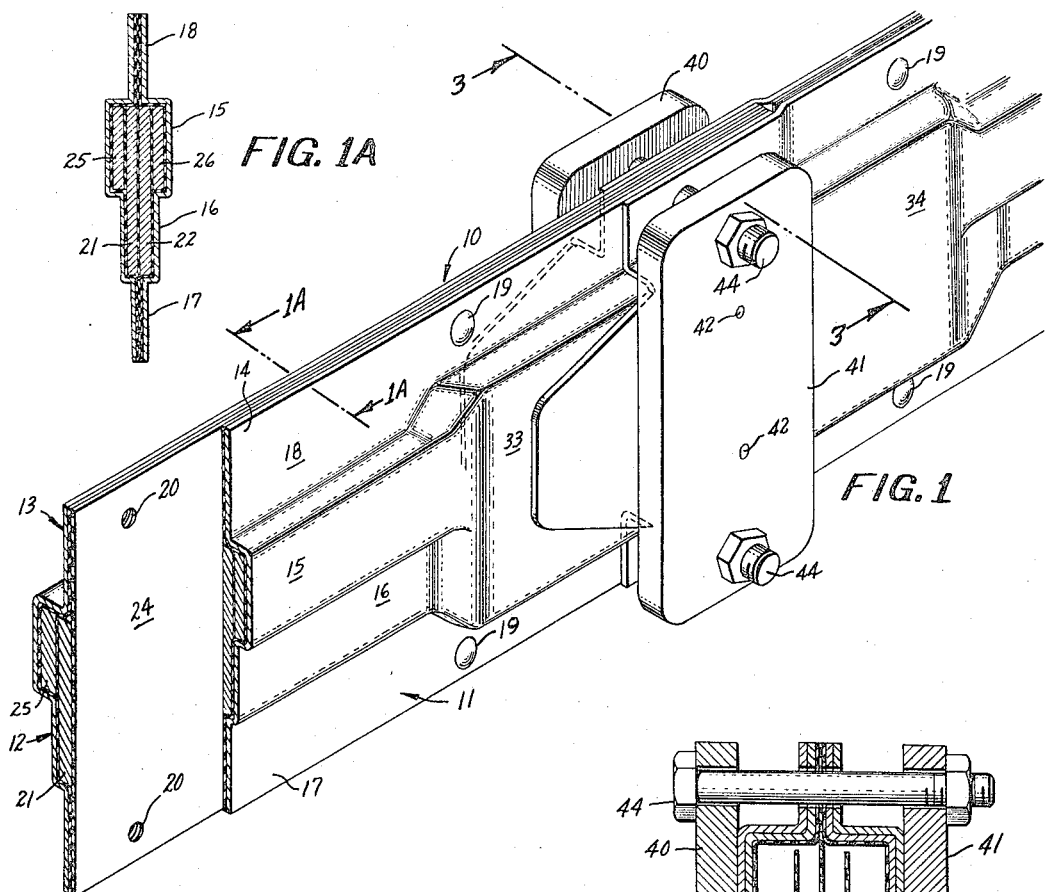
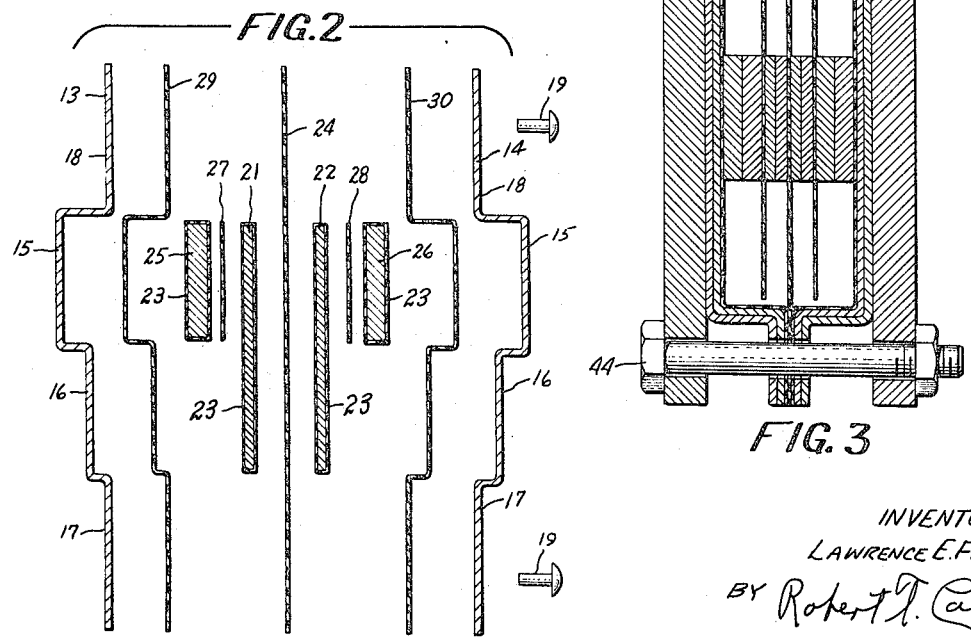
INVENTOR.
LAWRENCE E. FISHER
BY Robert T. Casey
ATTORNEY

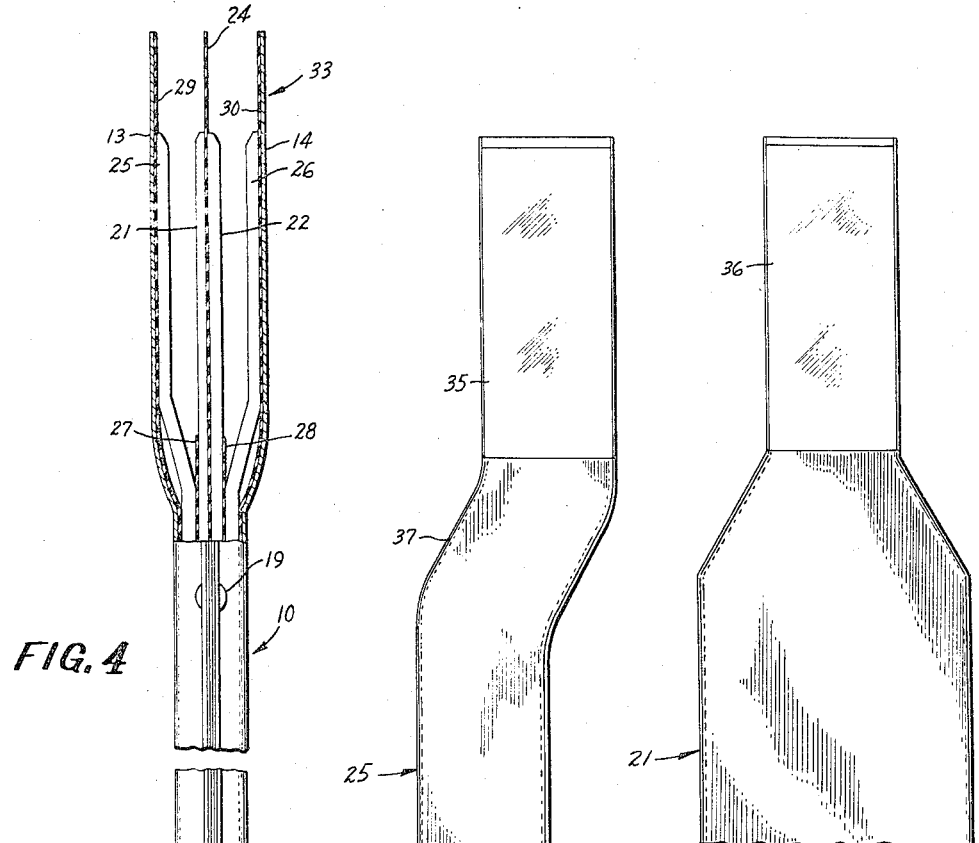

May 21, 1968          L. E. FISHER          3,384,856

MULTI-PHASE ELECTRIC POWER DISTRIBUTION SYSTEM

Filed April 15, 1966          6 Sheets-Sheet 3

INVENTOR.
LAWRENCE E. FISHER
BY Robert T. Casey
ATTORNEY

INVENTOR
LAWRENCE E. FISHER
BY Robert T. Casey
ATTORNEY

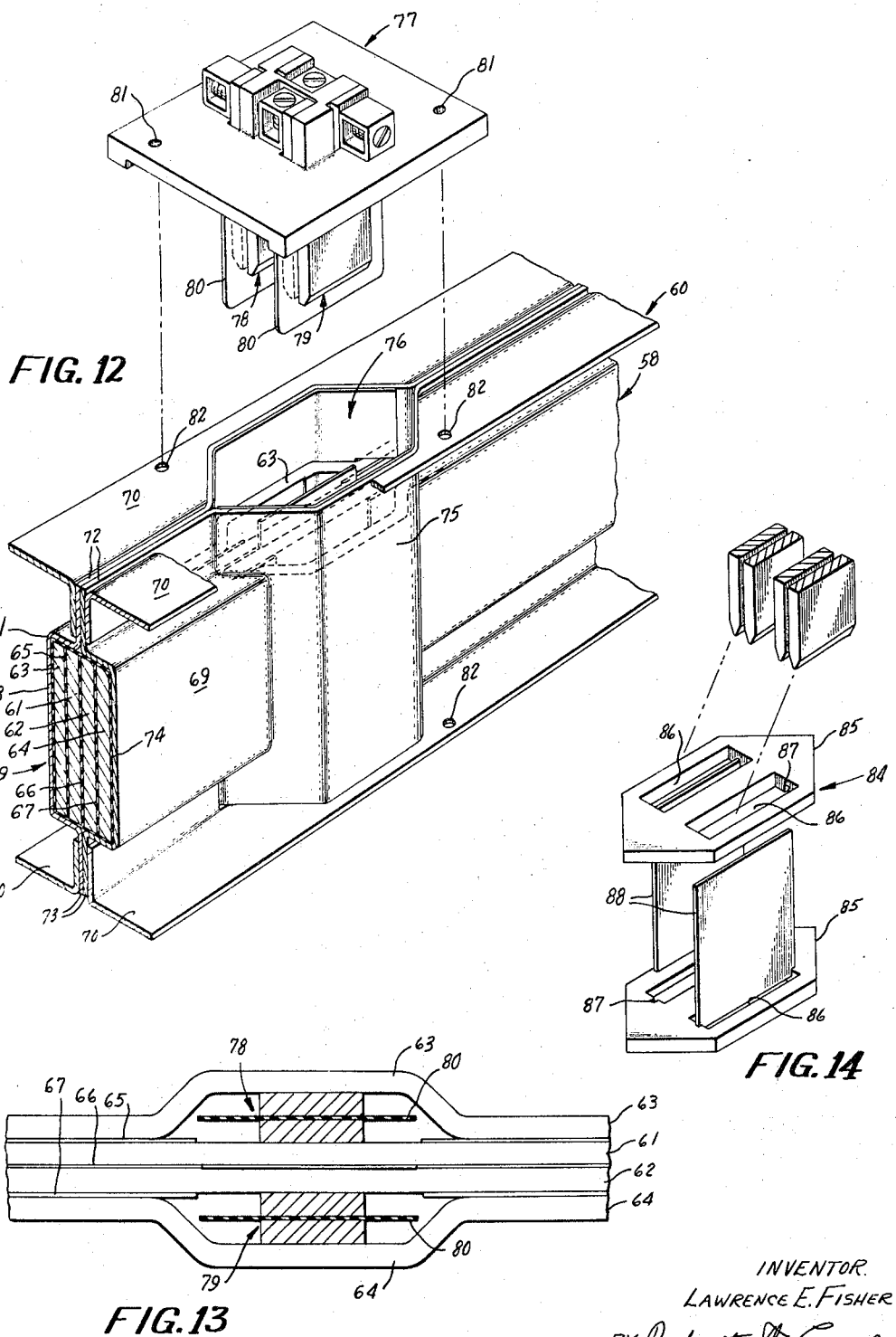

May 21, 1968 L. E. FISHER 3,384,856
MULTI-PHASE ELECTRIC POWER DISTRIBUTION SYSTEM
Filed April 15, 1966 6 Sheets-Sheet 6

INVENTOR.
LAWRENCE E. FISHER
BY Robert N. Casey
ATTORNEY

United States Patent Office 3,384,856
Patented May 21, 1968

3,384,856
MULTI-PHASE ELECTRIC POWER
DISTRIBUTION SYSTEM
Lawrence E. Fisher, West Hartford, Conn., assignor to
General Electric Company, a corporation of New York
Filed Apr. 15, 1966, Ser. No. 542,925
12 Claims. (Cl. 339—22)

ABSTRACT OF THE DISCLOSURE

An enclosed electric power busway system, the busbars of which comprise a closely stacked busbar assembly including an inner pair of relatively thin and wide busbars and an outer pair of relatively thick and narrow busbars, enclosed in a thin, closely fitting, metallic housing, which is in electrically insulated but good thermally conducting relation with the outer bars and also with side surfaces of the inner bars at the portions thereof projecting beyond the outer bars in the width-wise direction. Portions of the housing are deformed outwardly to provide pockets affording access to the busbars by contact probes for power take-off purposes. Since the inner bars are wider than the outer bars, portions thereof are available for contact, so that contact can be made to all bars by such contact probes.

Background of the invention (1) *Field of the invention.*—My invention relates to electric power distribution systems of the busbar type, commonly referred to as "busways," and more particularly to multiphase busways of relatively high capacity, such, for example, as 400 to 2000 amperes at 600 volts.

(2) *Description of the prior art.*—High capacity multi-phase busways of the prior art, as exemplified by the showings in U.S. Patent Numbers 3,018,320 and 3,183,-299, which are assigned to the same assignee as the present invention, have generally consisted of insulated busbars individually supported in spaced side-by-side relation. In some embodiments, the entire surface of the busbars has been covered with insulation, while in others insulation has been provided only along the edge portions thereof. The housing for the busbars has consisted of two metallic sheets having generally U-shaped cross-sections, spaced from the busbars, which when secured together have given these prior art busways a characteristic box-like appearance.

An undesirable feature of these earlier busways has been their large size and, correspondingly, their great bulk, which has made them cumbersome devices to handle during installation and difficult to support in place. Thus space considerations have often necessitated the use of other forms of electric power carrying means in place of busways. In addition, the spaced relation of the bars and the spacing of the bars from the housing, characteristic of prior busways has resulted in very inefficient dissipation of heat from the bars to the surrounding air, thus requiring busbars of large cross-section to avoid overheating. A new busway has, therefore, been sought which could be used in installations where space is restricted, which would be less costly to make, which would be easier to handle during installation because of its smaller size and lighter weight, and which would have improved thermal dissipation characteristics.

Objects of the invention

It is a general object of the present invention to provide high capacity multi-phase busway, which is of extremely small size when compared to other busways, thus permitting simplified application and a low installed cost, and which also has excellent performance characteristics, specifically with respect to low temperature-rise, high possible current density, and low voltage drop.

A particular object of the invention is to provide a multi-phase busway of the type having improved thermal dissipation means from the intermediate busbars to the housing.

A further object of the invention is to provide a multi-phase busway having improved thermal dissipation characteristics as mentioned in the preceding paragraph, and also having high physical strength so as to enable it to be supported at points widely-spaced longitudinally, and also to securely support required power take-off devices.

Another object of the invention is to provide a busway having a housing which is well-suited to improve thermal dissipation and which at the same time is well adapted to the attachment and support of busway power take-off plugs.

A still further object of the invention is to provide a busway of the type described which also includes a joint construction for connecting successive lengths, which joint is extremely simple and compact, being not substantially larger in cross-section than the busway at other points.

Summary of the invention

In accordance with the invention, a multi-phase electric power busway is provided including at least three insulated bus bar conductors in direct side-to-side contact with each other. A metallic housing is further provided, having side portions directly in contact with the insulated outer side portions of the outermost bus bars to absorb heat therefrom by conduction. In addition, the bus bar conductor or conductors intermediate the outermost bars have portions thereof projecting from between the outer bars in a width-wise direction, and the housing has a portion or portions brought into direct contact with insulated side wall portions of such projecting portions of the intermediate bus bars, to also draw heat directly from such intermediate bars to the housing.

In accordance with the invention in one form, a pair of outer insulated busbars is provided, and between these an inner pair of insulated busbars of substantially greater width, all four insulated busbars being in direct side-to-side contact. An elongated metallic housing is provided comprising two generally planar halves, attached together at their opposite edges and "sandwiching" the assembly of busbars therebetween, each half having a first portion in contact with the insulated outer side of one of said outer busbars, and a second portion offset from said first portion and brought into direct contact with the insulated side portion of one of said intermediate busbars at the region thereof extending beyond said outer bars.

In accordance with a further aspect of the invention, the housing sides or halves are extended from their meeting edges to provide wide flange portions to further improve the thermal dissipation ability thereof.

In accordance with a further important aspect of the invention, the portions of the intermediate busbars which extend width-wise beyond the outer busbars are utilized for the purpose of withdrawing power by means of plug-in type power take-off devices. For this purpose, the housing halves, at certain points, are formed outwardly to provide access openings or pockets which not only permit access to the bars by contact probes, but also serve to protect such contact probes from accidental contact by an outside agency thereafter.

The invention will be more fully understood by reference to the following detailed description, taken in conjunction with the accompanying drawings, and its scope will be pointed out in the appended claims.

Brief description of the drawing

Referring to the drawing:

FIGURE 1 is a perspective view of a section of a busway in accordance with the present invention, including a busbar joint;

FIGURE 1A is a sectional view of the busway of FIGURE 1, taken substantially on the plane indicated by the line 1A—1A of FIGURE 1;

FIGURE 2 is an exploded cross-sectional view similar to that of FIGURE 1A;

FIGURE 3 is a cross-sectional view of the busway of FIGURE 1, showing the joint connection taken along sectional line 3—3 of FIGURE 1;

FIGURE 4 is a plan view of a section of "feeder type" busway in accordance with the invention;

FIGURE 5 is a side view of an end portion of one of the outer busbars of the busway of FIGURE 4;

FIGURE 6 is a side view of an end portion of one of the inner busbars of the busway of FIGURE 4;

FIGURE 12 is a perspective view of another embodiment of the busway of the present invention;

FIGURE 13 is a plan view of the busway of FIGURE 12 with parts broken away for purposes of clarity;

FIGURE 14 is a perspective view of insulation members used in the busway of FIGURE 12 at the power take-off points;

Description of a preferred embodiment

Figure 7A:
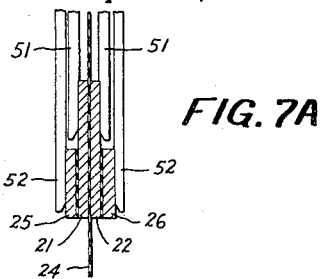
FIGURE 7A is a semi-diagrammatic view showing the busbars and stab contacts in engaged condition.

Referring now to FIGURE 1, there is shown therein a busway 10 of the "feeder type," that is, a busway wherein connections are made only at the opposite ends of each busway section and not by plug-in power take-off devices intermediate such ends. The busway 10 includes an elongated housing 11 and a busbar assembly 12 enclosed and supported therein.

The housing 11 comprises a pair of metallic side walls 13 and 14, each of which contains portions 15 and 16 that are contoured so as to enclose the busbar assembly 12 in a closely-fitting, envelope type fashion. Each of the side walls is also provided with relatively wide flange portions 17 and 18, for a purpose which will be described later. The two side walls are secured together by means of a plurality of rivets 19 which are placed in the holes 20 provided at spaced points along the length of each section of busway.

As shown in FIGURE 2, the busbar assembly 12 includes an inner pair of busbars 21 and 22, each of which from a dimensional standpoint is relatively thin and wide. Each of these busbars is individually provided with a layer of insulation 23, and, in addition, the bars are separated by an insulation barrier 24.

A pair of relatively thick and narrow outer busbars 25 and 26 are separated from the inner bars 21 and 22 by insulation members 27 and 28. These insulation members supplement the layer of insulation 23, which is also present on the bars 25 and 26. Although the inner and outer busbars differ as to width and thickness, the cross-sectional area of the inner busbars is approximately the same as that of the outer busbars.

The busbar assembly 12, therefore, consists of a pair of insulated inner busbars 21 and 22 separated by the insulation barrier 24, a pair of insulated outer busbars 25 and 26, and insulation members 27 and 28, which are interposed between the inner and outer busbars. This arrangement gives the busway 10 a characteristic "sandwich"-like appearance and structure.

As can be seen from FIGURE 2, there are additional layers of insulation 29 and 30 placed between the busbar assembly 12, and the side walls 13 and 14 of the housing. Thus, all the busbars are not only insulated from each other, but they are also insulated from the housing.

This arrangement of the busbar assembly 12 in the housing 11 is such that the busbars are directly in contact with the housing through a relatively thin layer of insulation. Thus, the heat which passes by conduction from the busbars to the housing side walls is dissipated by radiation and convection from the wide flange portions 17 and 18 of the side walls, the flange portions in essence acting as radiating fins.

In order to provide a simplified means of connecting adjoining busway sections, the housing side walls at each end of a section of busway are symmetrically spread outwardly from a common axis. This relationship is best seen in FIGURES 1 and 4. Thus, it can be observed that the side walls are spread outwardly to substantially the same extent and that the insulation barrier 24, which separates the inner busbars, may be taken as a point of reference for the common axis.

One end such as that designated 33 in FIGURE 4 of each busway section is formed with the outer busbars 25 and 26, and the layers of insulation 29 and 30, symmetrically spread outwardly from the same common axis as the side walls 13 and 14. This spreading is accomplished in such a manner that the busbars, and the insulation members remain in physical contact with the side walls. At the same end, the inner busbars 21 and 22, as well as the insulation barrier 24, remain substantially straight, thereby, creating open areas between the inner busbars and the outer busbars. It should be noted here that the insulation members 27 and 28 extend only approximately to the point where the spreading of the outer busbars 25 and 26 commences. Also, to be noted is the fact that a portion of the outer surfaces of the inner busbars and a portion, designated 35 in FIGURE 5, of the inner surfaces of the outer busbars are free of insulation at the joint.

At the other end, designated 34 in FIGURE 4, of the busway section, the side walls 13 and 14 are similarly symmetrically spread outwardly from a common axis. However, here the spread of the side walls is greater than that of the side walls at the other end of the busway section for a purpose that will be described later. Also, at this end, the layers of insulation 29 and 30, as well as the insulation barrier 24, do not extend into the joint, but rather approximately only to where the spreading of the side walls begins. A separate unit consisting of the inner busbar 21, insulation member 27, and the outer busbar 25, and another unit consisting of the inner busbar 22, an insulation member 28, and the outer busbar 26, are formed at the end 34. Each of these units is symmetrically spread outwardly only to a slight extent, for a reason to be set forth later. Thus, open spaces exist between the two units and also between each unit and the adjacent side wall. At this same end of the busway section, the outer surfaces of the outer busbars, and the inner surfaces of the inner busbars, each include portions in the joint area, which are free of insulation. FIGURE 6 shows an inner busbar with a portion 36 free of insulation.

As shown in FIGURE 1, the joint connection is made by inserting one end of a busway section, designated 33, into an end of an adjoining busway section, designated 34. This is possible because the spread of the side walls of the end 33 is less than that of the side walls of the end 34. Further, the inner busbars 21 and 22 which are straight at the end 33, as shown in FIGURE 4, will fit between the two separated pairs of bus bars described above. A flat surface-to-surface overlapping of the busbar ends therefore results.

In order to insure good and uniform contact pressure on the busbars at the joint connection, however, it is desirable to have the busbars overlap at a point which represents approximately the center line of the busway housing 11. This is accomplished by providing the outer busbars 25 and 26 with a vertical offset 37, as seen for example in FIGURE 5. Also, the ends of the inner busbars, one of which is shown in FIGURE 6, are narrowed down so that their width approximates that of the outer busbars. Therefore, as shown in FIGURE 3, at the joint the overlapped ends of the busbars are centered on the center line of the busway housing 11, and all of the busbars are approximately the same width.

The reduction in cross-sectional area of the inner busbars at the joint does not have a detrimental effect on the over-all current carrying performance of the busbar assembly. This is because at the joint, the inner busbars are overlapped, and the cross-sectional area of these bars when considered together, approximates that of the unnarrowed portions of each separate inner busbar.

A heavy pressure is maintained on all contact surfaces by means of two heavy spring steel clamps 40 and 41. Preferably, each of the steel clamps is secured to the side walls 13 and 14, respectively, at the end of the busway section, designated 34, by means of screws 42 suitably provided in the holes 43. These clamps, being externally placed with respect to the housing side walls, are bolted together by two bolts 44, which serve also to bolt the side walls together at the joint. This heavy pressure applied to the overlapping ends of the busway sections, insures that there will be a good electrical connection from one busway section to the other.

Figure 7:
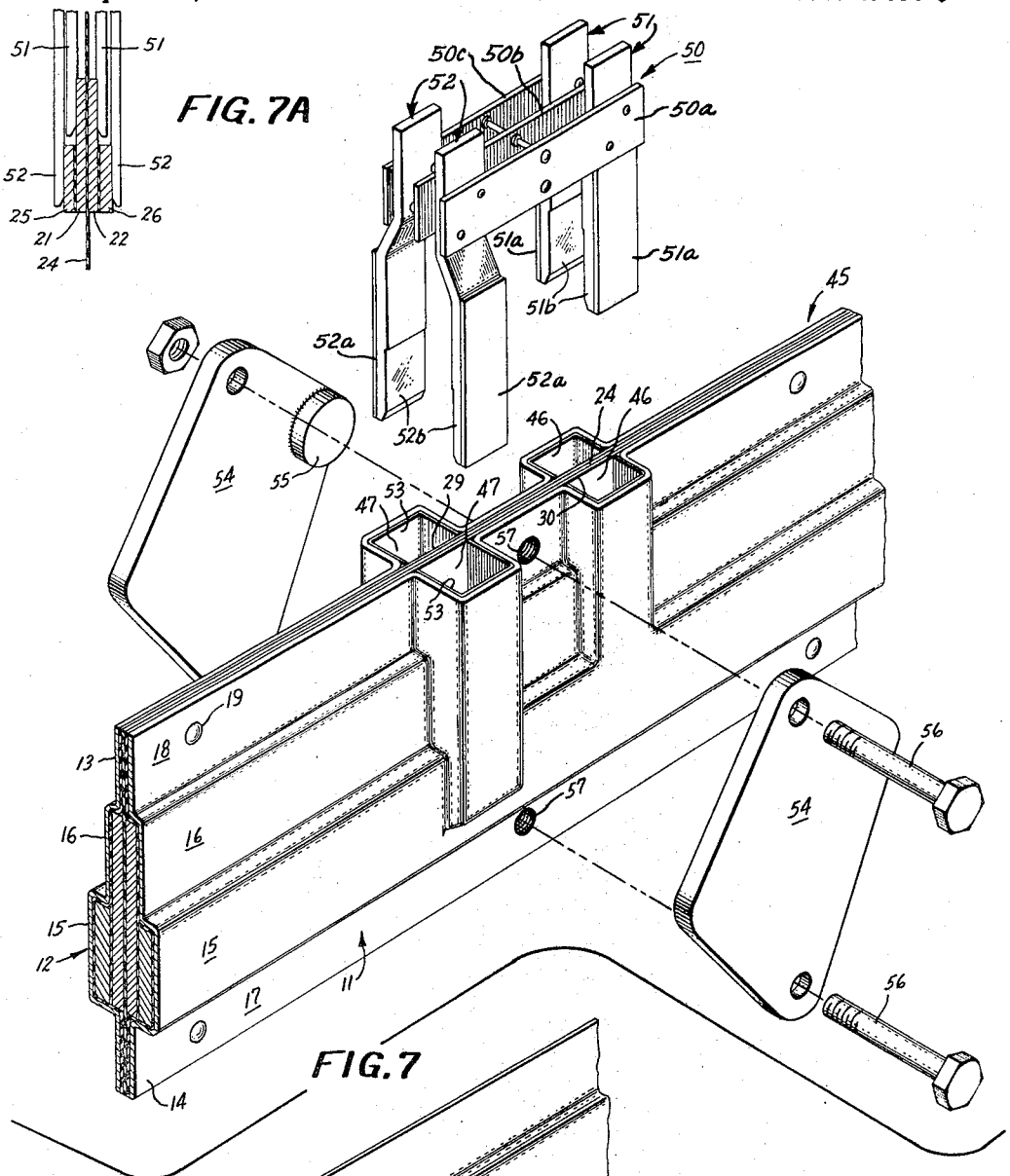
FIGURE 7 is a perspective partially exploded view of a section of "plug-in" busway in accordance with the invention.

In accordance with another aspect of the invention, there is provided a "plug-in" busway 45 as shown in FIGURE 7, that is, a busway in which a plurality of branch take-off connections can be made at spaced points along the length of each section. The elements of the "plug-in" busway 45 corresponding to those of the "feeder" busway 10 have been designated by the same reference numerals.

The busway 45 consists of an elongated housing 11, and a busbar assembly 12. The housing 11 includes a pair of metallic side walls 13 and 14 contoured to the shape of the busbar assembly 12, and a pair of wide flange portions 17 and 18. Here also the wide flange portions serve as radiating fins to dissipate by convection and radiation the heat, which is transmitted by conduction from the busbar assembly to the housing side walls. The transfer of heat by conduction is greatly assisted by the close fitting relationship which exists between the busbar assembly and the housing, due to the contoured portions provided in the housing side walls.

Unlike the housing side walls of the "feeder" busway, the side walls 13 and 14 of the "plug-in" busway are each provided with pairs of openings 46 and 47, located at spaced points along the length of each busway section. These openings provide access for making branch power take-off connections. The openings, as can be seen in FIGURE 7, are symmetrically located with respect to the center line of the housing at each location. The openings are produced in the edge of the busway 45 by forming each of the housing side walls outwardly from the insulation members 29 and 30. It will be noted that these insulation members are the same members which insulate the side walls 13 and 14 from the busbar assembly 12.

The openings 46 serve as a means of access to the inner busbars of the busbar assembly. Therefore, since the inner busbars are positioned in the contoured portions 16 of the housing side walls, the openings 46 need only extend inwardly to the point where the contour portions 16 meet the contour portions 15. Similarly, the depth of the openings 47 is made such that the openings may provide a means of access to the outer busbars of the busbar assembly, which are enclosed in the contour portions 15.

Figure 8:
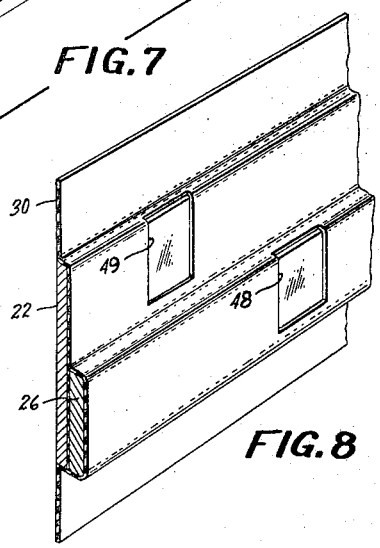
FIGURE 8 is a perspective view of portions of the busway of FIGURE 7, showing the openings provided in the insulation for the purpose of making a branch power take-off connection.

As shown in FIGURE 8 with respect to insulation member 30, openings 48 and 49 are provided in each of the insulation members 29 and 30 at the point where branch take-off connections are to be made. Correspondingly, the insulation 23, present on each of the bars of the busbar assembly, is removed from the portions of the bars underlying the openings 48 and 49 provided in the insulation members 29 and 30.

In order to make a branch power take-off connection through the narrow openings 46 and 47, there is provided a contact stab assembly 50 (see FIGURE 7), comprising four contact stabs or connecting members, one for each of the busbars of the busbar assembly. Two of the contact stabs, designated 51, are shorter than the other two contact stabs, designated 52. This difference in stab length corresponds to the difference in depth of the openings 46 and 47. The two stabs 51 enter the two openings 46, the openings being separated by the insulation members 29 and 30, and the insulation barrier 24, and there make contact with the inner busbars. Similarly, the two stabs 52 enter the openings 47, and make contact with the outer busbars 25 and 26 of the busbar assembly. The stabs 51 and 52 are insulated from the metallic side walls at the openings 46 and 47 through the use of insulation bodies 53, which are inserted into the openings. These bodies 53 have the same shape as the internal configuration of the openings 46 and 47. As further seen in FIGURE 7, the stabs 51 and 52 are held in spaced insulated relation by the crosspieces 50a, 50b, 50c and are further insulated from each other by virtue of the fact that each of the stabs 51, 52 is provided with a suitable layer of insulation 51a, 52a, respectively, except for the portions 51b, 52b, respectively thereof which actually engage the bushbars 21, 22, and 25, 26, respectively.

Unusually high force is maintained on the stab-to-busbar contacts by means of two heavy spring steel plates 54 (see FIGURE 7). As shown in FIGURE 7, these plate have a triangular shape, and are provided with a raised portion 55. The raised portions 55 serve to compensate for the fact that the side wall portions of the housing of the openings 46 do not extend outwardly from the insulation members 29 and 30, as far as do the side wall portions at the openings 47. These plates are secured together externally of the housing side walls by means of two bolts 56 positioned in the holes 57, the bolts also serving to bolt the side walls of the housing together at the point where the branch power take-off connection is being made.

Preferably, the housing side walls of the plug-in busway 45 are secured together in the same fashion as the feeder busway 10. That is, as shown in FIGURE 1, by means of a plurality of rivets 19 positioned in holes 20 provided at spaced points along the length of the busway section.

A further similarity between the plug-in busway 45 and the feeder busway 10 lies in the manner of connecting adjoining busway sections. With respect to the interconnection of sections of plug-in busway, the ends of the busway sections are constructed in the same manner as that previously described with respect to the showings of feeder busway sections in FIGURES 1, 3, and 4. Thus, the same overlapping of the busbar ends exists, as well as the use of heavy spring steel clamps 40 and 41 bolted together externally of the housing side walls, to apply pressure on the overlapped busbars at the joint.

Figure 10:
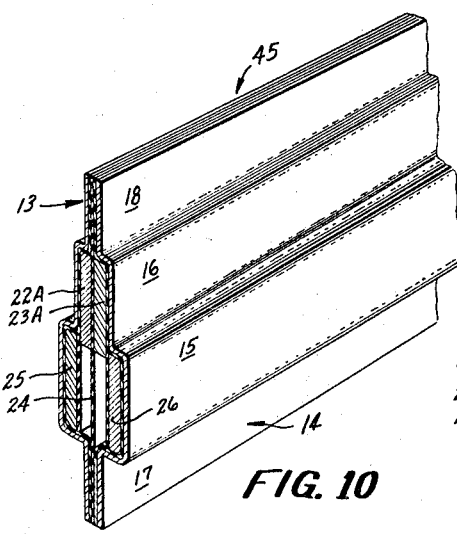
FIGURE 10 is another perspective view of the embodiment of FIGURE 9, at a region where the inner busbars are offset upwardly.
Figure 9:
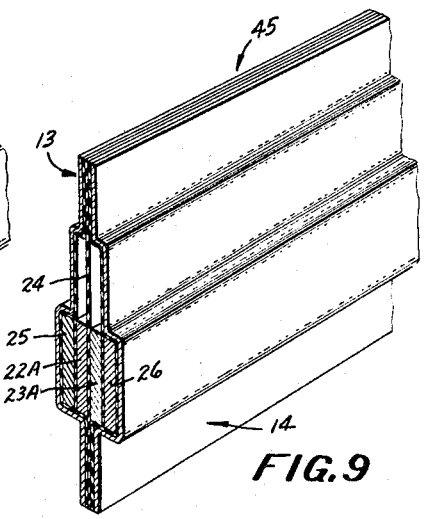
FIGURE 9 is a perspective view of another embodiment of the busway of the present invention utilizing busbars which are all of the same width and thickness.
Figure 11:
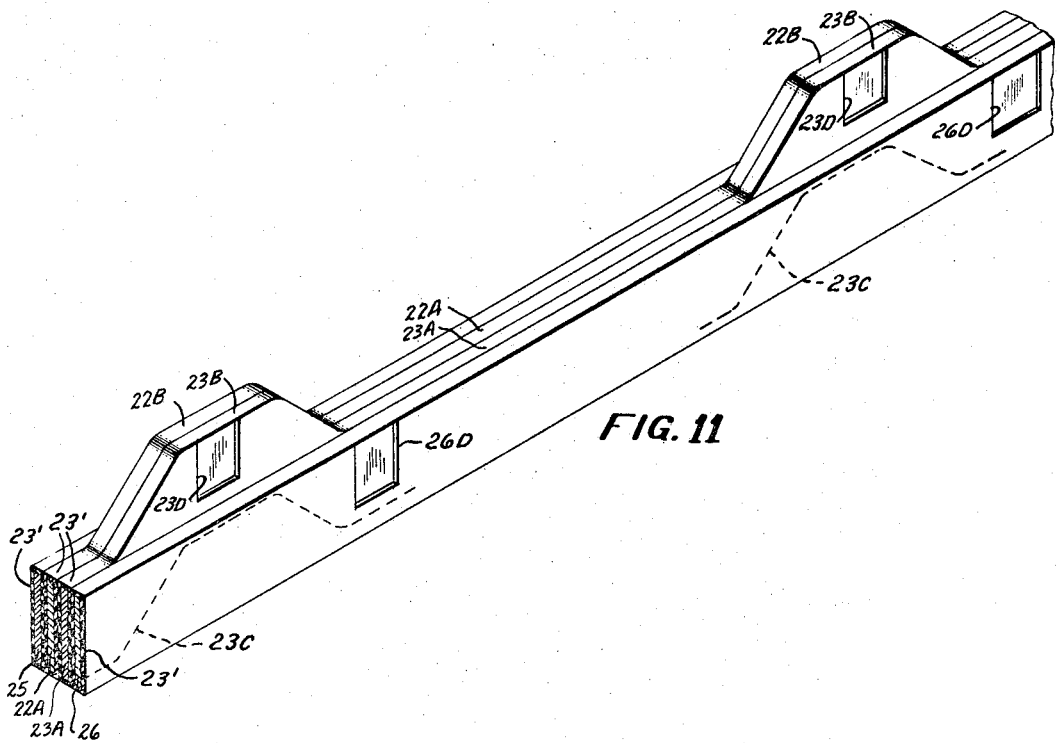
FIGURE 11 is a perspective view of the busbars of the embodiment of FIGURES 9 and 10 apart from the housing.

FIGURES 9, 10 and 11 relate to another embodiment comprising a busway wherein the inner busbars 22A and 23A have approximately the same thickness and width as do the outer busbars 25 and 26. As illustrated the busbars 22A, 23A, 25 and 26 are each provided with a suitable layer of insulation material 23'. Further, although not illustrated in FIGURE 11 for purposes of clarity, it is to be understood that there normally exists suitable insulation between the busbars and between the busbar and the housing side walls as shown in FIGURES 9 and 10. As best shown in FIGURE 11, the inner busbars 22A and 23A includes offset portions 22B and 23B, which are provided for the purpose of enabling branch power take-off connections to be made. The extent of offset provided in the busbars 22A and 23A is best seen with reference to the dotted lines 23C shown in FIGURE 11. Each of these lines represents the lower surface of the busbar 23A at the points at which the offset portions 23B are provided therein. The busbars 22A and 23A are offset outwardly toward the flange portions 18 to a sufficient extent such that the offset portions 22B and 23B are positioned in the contoured portions 16 of the housing side walls.

Thus, at spaced locations along the length of the plug-in busway section, the inner busbars 22A and 23A are provided with offset portions, and the housing side walls 13 and 14 are provided with openings 46 and 47, such as those shown in FIGURE 7. By using a plug, such as that designated 50 in FIGURE 7, a branch power take-off connection can be made wherein the stabs 51 of the plug will contact the sides of the offset portions 22B and 23B of the inner busbars 22A and 23A, respectively, and the stabs 52 will contact the outer busbars 25 and 26. Openings such as those designated by reference numerals 23D and 26D in FIGURE 11 are provided in the layers of insulation material 23' at each of the points where the branch take-off connections are to be made. Certain aspects of the embodiment shown in FIGURE 11 of the drawings and described hereinabove are disclosed and claimed in my co-pending application Ser. No. 548,723, filed May 9, 1966, and assigned to the same assignee as the present invention.

Referring now to FIGURE 12, there is shown another embodiment providing a plug-in busway. This is similar to the plug-in busway 45 in that it retains the layer-upon-layer relationship of the busbars, insulation, and housing so as to produce a sandwich-like construction. This busway 58 consists of a busbar assembly 59, and a housing 60.

The busbar assembly 59 comprises a pair of inner busbars 61 and 62, and a pair of outer busbars 63 and 64. Each of these busbars is of approximately the same width and thickness, and is provided with a layer of insulation. In addition, insulation barriers 65, 66, and 67 are interposed, between the inner bars 61 and 62, between the inner bar 61 and the outer bar 63, and between the inner bar 62 and the outer bar 64, respectively.

As also shown in FIGURE 12, the housing 60 includes a pair of metallic side walls 68 and 69, and four angle members 70. Each of the side walls is provided with a portion 71 contoured to the shape of the busbar assembly 59, and a pair of wide flange members 72 and 73.

Interposed between the busbar assembly 59 and the side walls 68 and 69, when the former is enclosed therein, is an insulation member 74. This arrangement provides for the existence of good thermal conduction between the busbars of the busbar assembly and the metallic housing 60, while still insuring that the entire busbar assembly 59 will be insulated from the side wall of the housing.

In the preferred embodiment of the busway 58, an angle member 70 is secured to each of the flange members of the side walls, preferably by means of spot welds. The spot welds, which may be made either at the time the metallic side walls are joined or subsequently thereto, are located at spaced points along the length of the section of busway. These angle members serve the dual function of providing a support means, which aids in the installation of the busway, and also they represent additional surface area from which heat may be dissipated by radiation and convection.

In order to permit branch power take-off connections to be made, the housing side walls 68 and 69 include portions 75 which are formed outwardly away from the common axis represented by the insulation member 66, so as to create plug-in openings 76. At this same location, the outer busbars 63 and 64 are correspondingly formed outwardly from the same common axis. Thus, as shown in FIGURE 13, the outer busbars 63 and 64 are spaced from the inner busbars 61 and 62, respectively.

A plug 77 is provided for the purpose of making the branch power take-off connection. This plug includes pairs of contact stabs 78 and 79, each of which is separated by an insulation member 80. As shown in FIGURE 13, a pair of stabs is inserted between the spaced outer and inner busbars in such a manner that one of the stabs of each pair of stabs contacts the inner surface of an outer busbar, and the other makes contact with the outer surface of the inner busbar. It should be noted here that the layer of insulation provided on each busbar is removed from the inner surfaces of the outer busbars, and the outer surfaces of the inner busbars at the opening 76 to provide uninsulated contact areas. Also to be noted, is the fact that, although FIGURE 12 shows only one plug 79 being inserted into the opening 76, a second plug 79 could be inserted into the opening from the bottom side of the busway.

The plug 77 is secured in place by means of screws, or other similar fastening devices inserted into the holes 81 provided in the plug 79, and the holes 82 provided in the angle members 70. Similar holes 82 are provided in the angle member on the bottom side of the busway as shown in FIGURE 12.

FIGURE 14 illustrates an insulation arrangement which is preferably used in the opening 76 of the busway 58. This arrangement includes two separate insulation bodies 85, each of which is provided with a pair of openings 86. The insulation members 88 are inserted into grooved slots 87 in the side walls of the openings 86. In assembly, the bodies 85 are inserted into the top and bottom portions of the busway, being retained therein by way of a frictional fit. Then the insulation members 88 are properly positioned in the slots 87. The members 88 perform the same function as do the members 80 in FIGURE 12, that is, they provide an insulation barrier between the individual stabs of each pair of stabs 78 and 79. Here, also, a branch power take-off connection could be made from either side of the busway.

With respect to interconnecting sections of the plug-in busway 58, the ends of the busway section are constructed in the same manner as previously described with respect to the feeder busway sections shown in FIGURES 1, 3 and 4. In this case, however, there is no requirement for outwardly offsetting the outer busbars at the joint as shown in FIGURE 5, or for providing the inner busbars with narrowed portions as shown in FIGURE 6, inasmuch as all the busbars have approximately the same dimensions.

It is contemplated within the scope of the present invention that the busway 58 in FIGURE 12 may be made in straight lengths, that is, with the branch take-off connection openings omitted, so as to provide a feeder busway wherein the busbars, all having the same dimensions, are enclosed in a closely fitting metallic housing.

Figure 16:
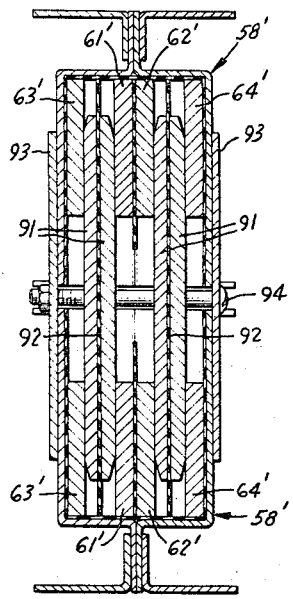
FIGURE 16 is a cross-sectional view of the busway of FIGURE 15, showing the interconnection taken along sectional line 16—16 in FIGURE 15.
Figure 15:
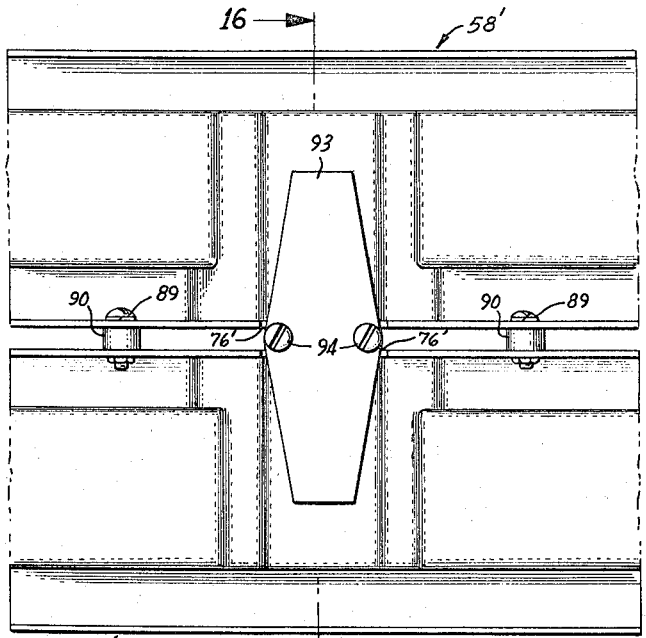
FIGURE 15 is a side view of a section of a busway in accordance with the present invention, illustrating the interconnection of two "runs" of busway.

In order to provide a means of obtaining larger current ratings with the busway of the present invention, separate sections of the busway may be secured together in side-by-side relation. This is best seen in FIGURES 15 and 16 of the drawing, wherein sections 58' of busway of the type described in connection with FIGURE 12 are shown fastened together by means of bolts 89, the latter being spaced longitudinally along the lengths of the busway sections. Of course, other suitable fastening means could be used in place of bolts. Spacers 90 are utilized along with the bolts 89 for a purpose to be described later.

The interconnection between the busbars 61', 62', 63', and 64' of each section 58' of the busway is accomplished by means of conductors 91, which in number equal that of the busbars found in each section of busway. In the embodiment shown in FIGURES 15 and 16, the conductors 91 are divided into pairs, with an insulation member 92 interposed therebetween.

Each busway section 58' is provided with one or more openings 76' for the purpose of permitting access to the busbars enclosed in the busway housing. These openings are similar to the plug-in openings 76 shown in FIGURE 12, except that only one side of the housing wall is provided with an opening at each location rather than both sides as shown in FIGURE 12. The openings 76' are suitably spaced along the lengths of busway sections 58' whereby when two of these sections are placed in side-by-side relation, the openings 76' face each other. Thus, the conductors 91 can be readily inserted into the openings 76' thereby providing the electrical interconnection between corresponding busbars of the busway sections 58'.

Appropriate contact pressure on the busbars and conductors is provided by a pair of pressure plates 93 which are positioned, as shown in FIGURE 16, on opposite sides of the interconnected busway sections. These plates are secured to each other by a pair of bolts 94, which straddle the conductors 91, and which are positioned in the space provided between the sections of busway by the spacers 90.

Figure 17:
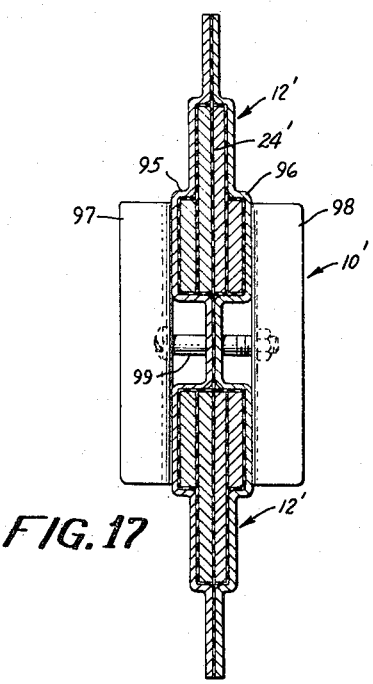
FIGURE 17 is a cross-sectional view of two busbar assemblies enclosed in a single busway housing in accordance with the invention.

FIGURE 17 illustrates the manner in which two busbar assemblies 12' of the busway of the present invention may be enclosed in a single busway housing. Each of the busbar assemblies 12' of the busway 10' is the same as the busbar assembly shown in FIGURES 1, 2, except that the insulation member 24' is of a sufficient width so as to be common to both busbar assemblies 12'. The side wall members 95 and 96 which form the housing for the busway 10' are each of unitary construction, and are fastened together by means of rivets or other suitable means in the manner described earlier with respect to the busway 10 shown in FIGURE 1.

If found desirable, the rigidity of the busway 10' may be increased by employing a pair of clamping plates 97 and 98 against the side wall members 95 and 96, respectively, as shown in FIGURE 17. The plates may be secured in position by means of a bolt 99.

Figure 18:
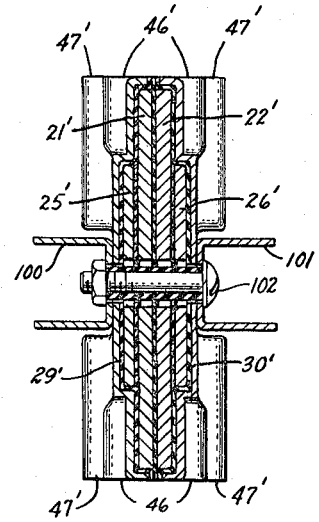
FIGURE 18 is a cross-sectional view of another embodiment of a "plug-in" busway in accordance with the present invention, having "plug-in" openings located in each side of the busway housing.

FIGURE 18 shows another embodiment of the busway of FIGURE 7 wherein openings 46' and 47' are provided on both sides of the housing whereby power take-off connections may be made from either side of the busway. This is accomplished by increasing the width of the busbars 21', 22', 25' and 26', and by forming the busway housing such that it conforms to the contour of the individual busbars and so that it includes openings 46' and 47' on either side thereof. Layers of insulation 29' and 30' similar to those designated by reference numerals 29 and 30 in FIGURES 2 and 7 are suitably provided between the busbars 21', 22', 25', 26', and the housing side walls. The power take-off connections are made in the same manner described earlier with regard to the busway shown in FIGURE 7 and the stab assembly 50, also shown therein.

Preferably, U-shape members 100 and 101, secured together by one or more bolts 102 passing through suitable openings in the busbars, are utilized to strengthen the busway in the manner shown in FIGURE 18. These members may extend the entire length of the busway section, or they may be positioned only where there are plug-in openings.

What I consider new and desire to cover by Letters Patent of the United States is:

1. A multi-phase electric power distribution system comprising:
   (a) a pair of relatively wide thin flat bus bars each having a relatively thin insulation covering thereon;
   (b) at least one intermediate relatively wide thin flat bus bar between said pair of bus bars and having a relatively thin insulating covering thereon;
   (c) all of said bus bars being supported in side-by-side relation;
   (d) said intermediate bus bar having at least a portion of the length thereof extending out from between said pair of bus bars, and
   (e) a metallic housing enclosing all of said bus bars, said housing having portions in directly contacting relation with said insulation covering of side portions of said pair of bus bars and also having portions in directly contacting relation with side portions of said portion of said intermediate bus bar which extends from between said pair of bus bars.

2. An electric distribution system comprising:
   (a) a first pair of generally rectangular cross-section busbars each having a pair of opposed relatively wide faces and a pair of opposed relatively narrow faces, said first pair of bus bars being supported in closely spaced side-by-side parallel relation with one of said wide faces of one of said bus bars in juxtaposed relation with one of said wide faces of the other said bus bars;
   (b) a relatively thin insulation covering one each of said first pair of bus bars;
   (c) a second pair of generally rectangular cross-section bus bars each having a pair of opposed relatively wide faces and a pair of opposed relatively narrow faces, said wide faces of said second pair of bus bars each being of substantially lesser width than said wide faces of said first pair of bus bars, said second pair of bus bars each being supported in closely spaced side-by-side parallel relation with one of said first pair of bus bars with one of said wide faces thereof in juxtaposed relation with one of said wide faces of said one of said first pair of bus bars;
   (d) a relatively thin insulation covering on each of said second pair of bus bars;
   (e) a metallic housing closely enclosing all of said first and second pairs of bus bars as a group and including portions in directly contacting relation with said insulation covering of each of said bus bars of said first and second pairs at said wide faces thereof.

3. An electric power distribution system as defined in claim 2 wherein all of said busbars have end portions of substantially equal width, said end portions being in side-by-side alignment and spaced apart to receive similar bus bar ends in overlapping relation.

4. An electric power distribution system comprising:
   (a) a first pair of generally rectangular cross-section bus bars each having a relatively wide face and a relatively narrow face;
   (b) an elongated relatively wide thin flat sheet of insulating material;
   (c) means supporting said first pair of bus bars with said wide faces thereof in flat-wise contact with opposite side surfaces of said sheet of insulating material;
   (d) a second pair of generally rectangular cross-section bus bars each having a relatively wide face and a relatively narrow face, said wide faces of said second pair of bus bars being of substantially lesser width than said wide faces of said first pair of bus bars;

(e) means supporting said second pair of bus bars with said wide faces thereof in flatwise insulated contact with said wide faces of said first pair of bus bars; and (f) a metallic housing closely enclosing all of said bus bars, said housing including portions in electrically insulated contact with at least a portion of said wide faces of each of said first and second pairs of bus bars.

5. An electric power distribution system comprising:

(a) a pair of outer bus bars of generally rectangular cross-section, each having a pair of opposed relatively wide faces and a pair of opposed relatively narrow faces;

(b) at least one intermediate bus bar of generally rectangular cross-section having a pair of opposed relatively wide faces and a pair of opposed relatively narrow faces, said wide faces of said intermediate bus bar each being of a greater width than said wide faces of said pair of outer bus bars;

(c) said pair of outer bus bars each being supported in closely spaced side-by-side parllel relation with said intermediate bus bar, and with one of said wide faces thereof in juxtaposed relation with one of said wide faces of said intermediate bus bar and defining a relatively wide thin elongated space therebetween;

(d) insulating means substantially completely filling each of said spaces between said outer bus bars and said intermediate bus bar; and (e) a two-part metallic housing closely enclosing all of said bus bars, each of said parts including extended flanges, said two-part metallic housing having portions in electrically insulated contacting relation with said wide faces of each said outer bus bars and said intermediate bus bar.

6. An electric power distribution system comprising:

(a) a first pair of generally rectangular cross-section busbars each having a pair of opposed relatively wide faces and a pair of opposed relatively narrow faces, said first pair of busbars being supported in closely spaced side-by-side parallel relation with one of said wide faces of one of said busbars in juxtaposed relation with one of said wide faces of the other of said busbars and defining a relatively wide thin elongated space therebetween;

(b) insulating means substantially completely filling said space between said first pair of busbars;

(c) a second pair of generally rectangular cross-section busbars each having a pair of opposed relatively wide faces and a pair of opposed relatively narrow faces, said wide faces of said second pair of busbars each being of substantially lesser width than said wide faces of said first pair of busbars, said second pair of busbars each being supported in closely spaced side-by-side parallel relation with one of said first pair of busbars with one of said wide faces thereof in juxtaposed relation with one of said wide faces of said one of said first pair of busbars and defining a relatively wide thin elongated space therebetween;

(d) insulating means substantially completely filling each of said spaces between said first and second pairs of busbars; and (e) a two-part metallic housing closely enclosing all of said busbars, each of said parts including extended flanges, said two-part metallic housing having portions in electrically insulated contacting relation with said wide faces of each of said busbars of said first and second pairs.

7. An electric power distribution system comprising:

(a) a first pair of outer busbars of generally rectangular cross-section, each having a pair of opposed relatively wide faces and a pair of opposed relatively narrow faces;

(b) at least one intermediate busbar of generally rectangular cross-section having a pair of opposed relatively wide faces and a pair of opposed relatively narrow faces, said intermediate busbar also having at least one portion extending beyond at least one of said opposed relatively narrow faces of one of said first pair of outer busbars;

(c) said first pair of outer busbars each being supported in closely spaced side-by-side parallel relation with said intermediate busbar, and with one of said wide faces thereof in juxtaposed relation with one of said wide faces of said intermediate busbar and defining a relatively wide thin elongated space therebetween;

(d) first insulating means substantially completely filling each of said spaces between said first pair of outer busbars and said intermediate busbar;

(e) said first pair of outer busbars and said intermediate busbar comprising a first busbar assembly;

(f) a second pair of outer busbars of generally rectangular cross-section, each having a pair of opposed relatively wide faces and a pair of opposed relatively narrow faces;

(g) at least one other intermediate busbar of generally rectangular cross-section having a pair of opposed relatively wide faces and a pair of opposed relatively narrow faces, said other intermediate busbar also having at least one portion extending beyond at least one of said opposed relatively narrow faces of one of said second pair of outer busbars;

(h) said second pair of outer busbars each being supported in closely spaced side-by-side parallel relation with said other intermediate busbar, and with one of said wide faces thereof in juxtaposed relation with one of said wide faces of said other intermediate busbar and defining a relatively wide thin elongated space therebetween;

(i) second insulating means substantially completely filling each of said spaces between said second pair of outer busbars and said other intermediate busbar;

(j) said second pair of outer busbars and said other intermediate busbar comprising a second busbar assembly said second busbar assembly being supported in spaced relation to said first busbar assembly; and (k) a metallic housing closely enclosing both of said first and second busbar assemblies, and including portions in electrically insulated contacting relation with said wide faces of each of said outer busbars and said extending portion of said intermediate busbar of each of said first and second busbar assemblies.

8. An electric power distribution system comprising:

(a) inner busbars of generally rectangular cross-section, each having a relatively wide face and a relatively narrow face;

(b) outer busbars of generally rectangular cross-section, each having a relatively wide face and a relatively narrow face;

(c) means supporting said outer busbars with substantially all of said wide faces thereof in flatwise insulated contact with said wide faces of said inner busbars; and (d) a metallic housing enclosing all of said busbars, said housing including portions formed outwardly thereof to provide a plurality of pockets affording access to said wide faces of at least some of said busbars whereby power take-off connections may be made.

9. An electric power distribution system comprising:

(a) inner busbars of generally rectangular cross-section, each having a relatively wide face and a relatively narrow face;

(b) an elongated relatively wide thin flat sheet of insulating material;

(c) means supporting said inner busbars with said wide faces thereof in flatwise contact with opposite side surfaces of said sheet of insulating material;

13

(d) outer busbars of generally rectangular cross-section, each having a relatively wide face and a relatively narrow face;

(e) means supporting said outer busbars with substantially all of said wide faces thereof in flatwise insulated contact with said wide faces of said inner busbars; and (f) a metallic housing enclosing all of said busbars, said housing including portions formed outwardly thereof to provide a plurality of pockets affording access to said wide faces of at least some of said busbars whereby power take-off connections may be made.

10. A multi-phase electric power distribution system comprising:

(a) a pair of relatively wide thin flat busbars each having a relatively thin insulation covering thereon;

(b) at least one intermediate relatively wide thin flat busbar between said pair of busbars and having a relatively thin insulating covering thereon;

(c) all of said busbars being supported in side-by-side relation;

(d) said intermediate busbar having at least a portion of the length thereof extending out from between said pair of busbars;

(e) a metallic housing enclosing all of said busbars, said housing having portions in directly contacting relation with said insulation covering of side portions of said pair of busbars and also having portions in directly contacting relation with side portions of said portion of said intermediate busbar which extend from between said pair of busbars; and (f) said housing including portions formed outwardly thereof to provide a first and a second pair of pockets, said first pair of pockets affording access to said side portions of said pair of busbars, and said second pair of pockets affording access to said side portions of said intermediate busbar whereby power take-off connections may be made.

11. A multi-phase electric power distribution system as defined in claim 10 including a plurality of clamping plates positioned in juxtaposed relation to said pockets, and means for applying contact pressure through said plates to said busbars.

14

12. A multi-phase electric power distribution system comprising:

(a) a pair of outer relatively wide thin flat busbars each having a relatively thin insulation covering thereon;

(b) a pair of intermediate relatively wide thin flat busbars between said pair of outer busbars and having a relatively thin insulating covering thereon;

(c) all of said busbars being supported in side-by-side relation;

(d) said pair of intermediate busbars each having at least a portion of the length thereof extending out from between said pair of outer busbars;

(e) a two-part metallic housing enclosing all of said busbars, each of said parts including extended flanges;

(f) said two-part metallic housing having portions in directly contacting relation with said insulation covering of side portions of said pair of outer busbars and also having portions in directly contacting relation with side portions of said portions of said pair of intermediate busbars which extend from between said pair of outer busbars; and (g) said two-part metallic housing including portions formed outwardly thereof to provide a first and a second pair of pockets, said first pair of pockets affording access to said side portions of said pair of outer busbars, and said second pair of pockets affording access to said side portions of said pair of intermediate busbars whereby power take-off connections may be made.

References Cited

UNITED STATES PATENTS

| | | | |
|---|---|---|---|
| 3,018,320 | 1/1962 | Rowe | 174—99 |
| 3,042,890 | 7/1962 | Gamble et al. | 339—22 |
| 3,044,036 | 7/1962 | Herrmann | 339—22 |
| 3,170,747 | 2/1965 | Herrmann et al. | 339—22 |
| 3,187,086 | 6/1965 | Moodie et al. | 174—88 |
| 3,189,680 | 6/1965 | Stanback | 174—88 |

MARVIN A. CHAMPION, *Primary Examiner.*

P. A. CLIFFORD, *Assistant Examiner.*